United States Patent
Pomella et al.

[15] 3,696,398
[45] Oct. 3, 1972

[54] ANALOG TO DIGITAL CONVERTERS HAVING MULTIPLE UNITS OF MEASUREMENT

[72] Inventors: Piero Pomella, Ivrea; Elia Baratto, Banchette; Luciano Lauro, Ivrea, all of Italy

[73] Assignee: Ing. C. Olivetti & S.p.A., Ivrea (Torino), Italy

[22] Filed: June 18, 1970

[21] Appl. No.: 47,320

[30] Foreign Application Priority Data
June 23, 1969  Italy...................52343 A/69

[52] U.S. Cl. ...340/347 AD, 235/92 EA, 235/92 VA, 324/99 D
[51] Int. Cl..........G06f 7/38, H03k 13/02, H04l 3/00
[58] Field of Search........340/347 P, 347 AD; 235/92 EA, 235/92 VA, 151.11; 318/603; 324/115, 116, 99 D

[56] References Cited

UNITED STATES PATENTS 3,531,800  9/1970  Brescia...............340/347 AD
3,228,021  1/1966  Lehmer...............340/347 AD

*Primary Examiner*—Maynard R. Wilbur
*Assistant Examiner*—Thomas J. Sloyan
*Attorney*—Birch, Swindler, McKie & Beckett

[57] ABSTRACT

An analog to digital converter capable of providing a digital indication of the analog signal in any of a number of digital units (e.g., inches or meters) and having coarse-fine measuring ability is disclosed. A feedback counter, which operates either in a fast or slow mode depending on the magnitude of the error signal, operates in a single unit system while a display counter operates in alternative unit systems.

8 Claims, 4 Drawing Figures

INVENTORS
PIERO POMELLA – ELIA BARATTO
LUCIANO LAURO

3,696,398

ANALOG TO DIGITAL CONVERTERS HAVING MULTIPLE UNITS OF MEASUREMENT

CROSS REFERENCE

The present invention relates to, and is an improvement on, the system described in application Ser. No. 860,116 now U.S. Pat. No. 3,531,800.

BACKGROUND OF THE INVENTION

1. Field of the Invention

The invention concerns measuring systems of the feedback type for expressing in digital form an analog quantity.

2. Description of the Prior Art

Analog to digital converters which include a counter and a digital to analog converter in a feedback loop are well known in the art as is evinced evidenced by the above cross reference U.S. Patent. An unsolved problem in the art has been that of economically providing a converter which would be capable of measuring in more than one measuring unit. That is, if one is measuring the analog displacement (rotational or linear) of a mechanical member, there are periods when one would prefer the digital information expressed in the metric system and other periods when an indication in the inch system would be found convenient. While the problem could be solved by the inclusion of meter-inch conversion circuity, this solution is unacceptable because of undue complexity and high cost. The problem is particularly acute when one is dealing with relatively sophisticated converters which are capable of coarse and fine measuring modes. These coarse-fine converters, such as that of the cross reference, are necessarily more complex than a single speed converter and this complexity makes it more difficult to efficiently and inexpensively integrate circuity which would allow the operator his choice of measuring units.

The present invention teaches a practical solution to the above problems. A converter which is capable of coarse-fine measuring modes is provided with internal timing circuitry which allows the operator to select the unit of digital measurement.

SUMMARY OF THE INVENTION

The converter is provided with two counters, one for providing an external manifestation of the measured quantity and the other being an element of the feedback loop. The analog quantity (e.g., a linearly moveable member) produces, via appropriate transducer means, an electrical analog error signal, which signal is directed to a unit selection transformer. The operator switches the selection transformer to the units in which he wishes the digital output to be expressed. For example, assume the choice of units in either microns ($10^{-6}$ meters) or $10^{-4}$ inches where 2.54 microns equal $1 \times 10^{-4}$ inches. If the unit choice is microns, the analog error signal is transmitted unalterated through the selection transformer and enters a control unit. The control unit decides whether or not there is an error signal, and, if so, whether the error is positive or negative. Further the control unit decides whether the conversion is to be carried out in the coarse or the fine mode. The coarse-fine selection is performed by a threshold element which notes whether or not the error signal is more the 100 times the magnitude of the selected measuring unit.

The control unit is connected to a counter and the counter, in turn, is connected to a digital to analog converter. The digital to analog converter is connected to the aforementioned transducing means to complete the feedback loop.

The feedback counter registers the analog displacement in the same unit system, regardless of the selected unit system, while the display counter registers the analog displacement in the selected unit system. If the selected unit system is the same as the feedback counter system, the feedback and display counters are incremented in an identical fashion.

If, on the other hand, the feedback counter system is different from the selected unit system, the feedback and display counter are incremented differently. For example, if the feedback counter system is microns and the selected system is $1 \times 10^{-4}$ inch (where 2.54 microns = $1 \times 10^{-4}$ inch) then if the display counter is incremented by a single unit, the feedback counter must be incremented so as to read 2.54.

This technique will be more completely described in connection with the following description of the specific embodiment.

It is an object of this invention to provide a converter capable of expressing an analog signal in a variety of units.

It is a further object to provide a multiple unit converter without the need of additional conversion circuitry.

It is a further object to provide a converter wherein the feedback counter operates in a single unit system while the display counter operates in a variety of unit systems.

It is a further object to provide a multiunit converter which is capable of coarse-fine conversion.

It is a further object to provide a multiunit converter which measures the analog quantity in a bidirectional fashion.

DESCRIPTION OF THE PREFERRED EMBODIMENT

Figure 1:
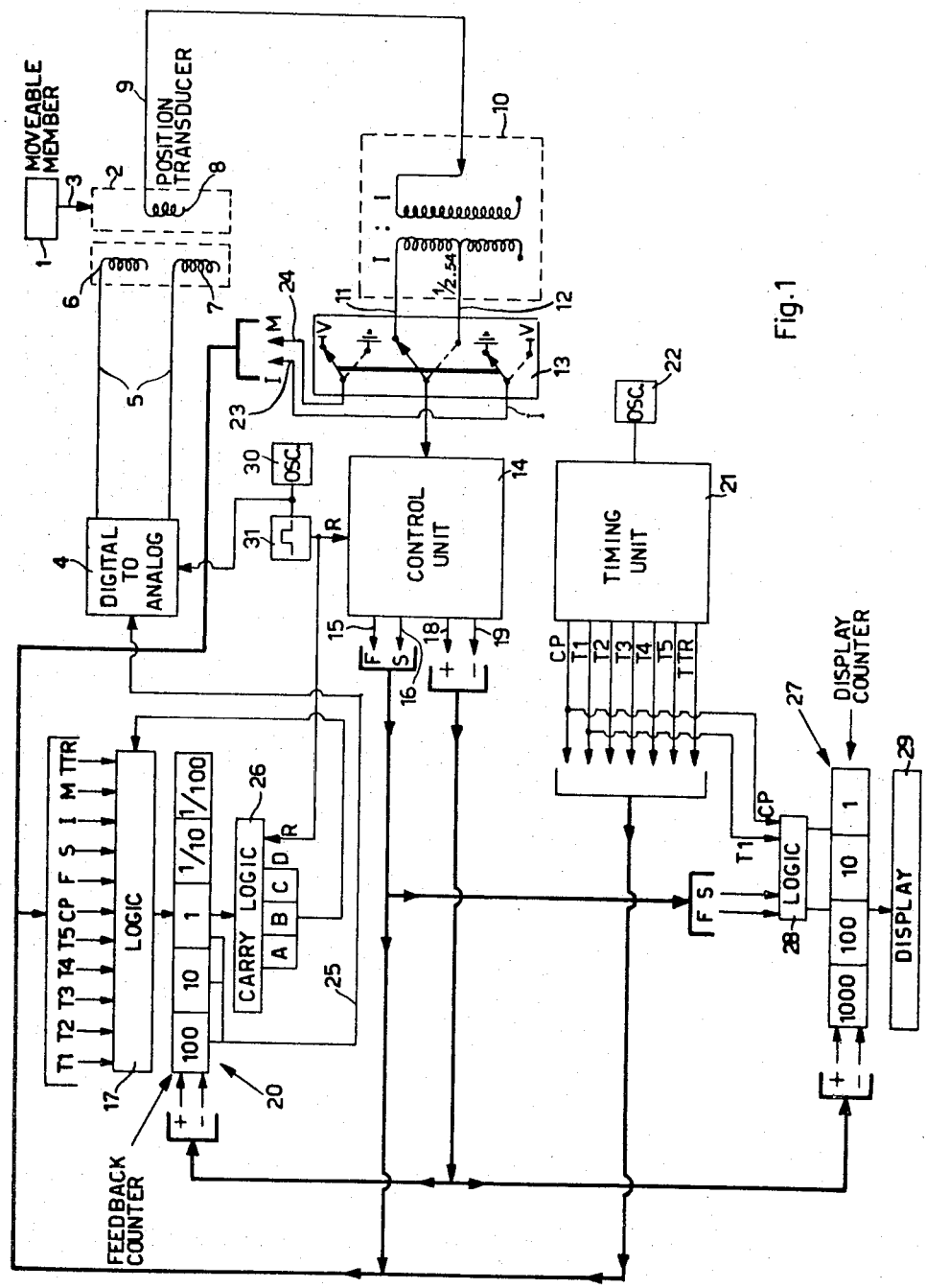
FIG. 1 shows a block diagram of an analog to digital converter constructed according to the teachings of this invention.

FIG. 1 shows an analog to digital converter wherein the position of moveable member 1 is expressed in digital format. Moveable member 1 is connected to position transducer 2 by means of mechanical linkage 3. Position transducer 2, which may be of the type described in U.S. Pat. No. 2,799,835, receives a feedback analog signal from digital to analog converter 4, which signal represents the digital indication currently contained in the converter's counters. The feedback analog signal is connected, by means of lines 5, to a pair of multipolar primary windings 6 and 7; primary windings 6 and 7 are fixed in space while multipolar secondary winding 8 moves in accordance with member 1 and linkage 3. Transducer 2 produces an analog error signal which represents the displacement of moveable member 3; this error signal is applied to transformer 10 via lead 9.

Transformer 10 performs the function of equalizing the units (i.e., inches, microns etc.) for internal utilization by the remaining converter circuitry. For example, assume that there are two alternate units of measurement to be selected from, namely microns and inch $\times$ $10^{-4}$. Since 1 micron = $10^{-4}$ cm = $(1/2.54) \times 10^{-4}$ inch or $10^{-4}$ inch = 2.54 microns it is apparent that the unit of measurement in the inch system (viz. $10^{-4}$ inch) is 2.54 times as large as the unit of measurement in the metric system (viz. 1 micron). If the operator desires that the displacement of member 3 be indicated in the metric system, selector switch 13 is placed in contact with lead 11, which lead carries the unaltered analog error signal since lead 11 is connected to a 1:1 transformer. If the operator desires that the position of moveable member 1 be expressed in inch units (i.e., $10^{-4}$ inch), selector switch 13 is placed in contact with lead 12, which lead carries the analog error signal reduced in amplitude by a factor of 1/2.54. Selector switch 13, which of course can also be any of a member of well known electronic switches, is connected to control unit 14, which unit is identical to that described in the cross referenced patent. Also connected to control unit 14 is oscillator 30 and squaring circuit 31 which means are used for timing the control unit 14, the digital to analog converter 4 and the reset for carry logic 26.

The control unit decides first whether or not there is an analog error signal of sufficient magnitude to warrant the alteration of the counter contents, secondly whether the error is positive or negative and third, whether the error signal is so great as to switch the converter operation to high speed.

The control unit 14 has outputs 15 and 16 which are connected to logic 17 and outputs 18 and 19 which are connected to counter 20. Outputs 15 and 16 dictate whether counter 20 should operate in a fast count mode or a slow count mode while outputs 18 and 19 determine whether counter 20 should count in a positive or negative direction.

Also connected to logic 17 are timing unit 21, which is fed by oscillator 22, and selector switch 13. Timing unit 21 supplies logic 17 with counting pulses CP, timing pulses T1-T5, and tens transfer pulses TTR (FIG. 3) while selector switch 13 supplies logic 17 with signals, via leads 23 and 24, which indicate whether the system is in the inch or metric mode. A voltage source V can be used to supply signals to leads 23 or 24 depending on whether the selector switch 13 is connected to lead 12 (inch mode) or 11 (metric mode) respectively.

Logic 17 is connected to feedback counter 20 which can contain, for example, 5 decimal decades. The decades correspond to 100, 10, 1, one-tenth, and one one-hundreds microns respectively. It should be noted that feedback counter 20 always counts in the same mode, namely the metric mode. The three highest decades of feedback counter 20 are connected via lead 25 to digital to analog converter 4.

Counter 20 feeds carry logic 26 which is, in turn, connected to logic 17.

Control unit 14 is also connected to display counter 27.

The positive-negative controls (leads 18 and 19) are connected directly to display counter 27 while the fast-slow controls (leads 15 and 16) are connected to counter 27 via logic 28. Also connected to display counter 27 via logic 28 are the counting pulses CP and timing pulses T1 which are emitted from timing unit 21. Display counter 27 is, in turn, connected to display means 29, which can be of any well known type.

OPERATION OF THE FIG. 1 EMBODIMENT

A description of the operation of the converter of FIG. 1, wherein the choice of display units in metric or inch, follows. As previously mentioned the converter of FIG. 1 can convert the analog movement of member 1 into either of two digital formats, microns ($10^{-6}$ meters) or $10^{-4}$ inches where 1 33 $10^{-4}$ inch = 2.54 microns. For simplicity, the metric unit of measurement ($10^{-6}$ meters) will be referred to as a micron and the inch unit of measurement ($10^{-4}$ inch) will be referred to as an inch system unit, remembering that 1 inch system unit is equal to 2.54 microns.

First assume that the operator desires the digital display 29 to indicate the movement of member 1 in microns; accordingly, selector switch 13 is placed in contact with transformer lead 11. An analog error signal is produced by position transducer 2 and carried, via lead 9, to transformer 10. Since selector 13 is in contact with lead 11, transformer 10 does not alter the magnitude of the error signal due to the fact that lead 11 is connected to the 1:1 section of the transformer.

The analog error signal will be fed to the control unit 14 and, if the member 1 has moved 1 micron or more, the control unit will cause feedback counter 20 to be incremented by one counting pulse CP from timing unit 21, which counting pulse CP represents a movement of 1 micron. Further control unit 14 will cause one counting pulse CP to be passed to display counter 27. There will therefore be a one micron count in both the feedback counter 20 and the display counter 27.

If, on the other hand, the operator desires the movement of member 1 to be expressed in inch system units, the selector switch 13 will be positioned on transformer output lead 12. In this case the analog error signal produced by position transducer 2 will be reduced in magnitude by a factor of 1/2.54. This is necessary because one inch system unit ($10^{-4}$ inch) is 2.54 times as large as 1 micron.

In order to overcome the threshold of control unit 14 it is therefore necessary for member 1 to move 1 micron if selector switch 13 is positioned at 11 or 2.54 microns if switch 13 is positioned at 12. If switch 13 is at 12 (inch system) and member 1 moves 2.54 microns (1 inch system unit) control unit 14 together with timing unit 21 will pass one counting pulse into display counter 27. The feedback counter 20 however remains in metric units and instead of one counting pulse CP being placed in the unit stage of the counter, there are placed 2 counting pulses in the unit stage, 5 in the 1/10 stage and 4 pulses in the 1/100 stage. For a movement of 2.54 microns by member 1, with the system switched to the inch mode, display counter will be increased by 1 and feedback counter will be increased by 2.54.

The contents of feedback counter 20 are fed via lead 25 to digital to analog converter 4 which completes the feedback loop by passing an analog signal representative of the contents of counter 20 to position transducer 2.

The fast-slow operation of the converter depends upon the magnitude of the analog error signal supplied to control unit 14. Within control unit 14 is a threshold which is 100 times as large as the basic unit threshold. Should the member 1 be displaced more than 100 microns while selector switch 13 is in the metric mode (i.e., connected to transformer lead 11) a counting pulse CP will be applied to the 100 decades of the feedback counter 20 and the display counter 27. If the converter is in the inch mode (i.e., switch 13 connected to transformer lead 12), member 1 must move more than 254 microns before the fast mode will be activated. In this case a single counting pulse will be applied to the 100 decades of the display counter 27 while the feedback counter 20 will receive 2 pulses in the 100 decade, 5 pulses in the 10 decade and 4 pulses in the units decade.

Figure 2:
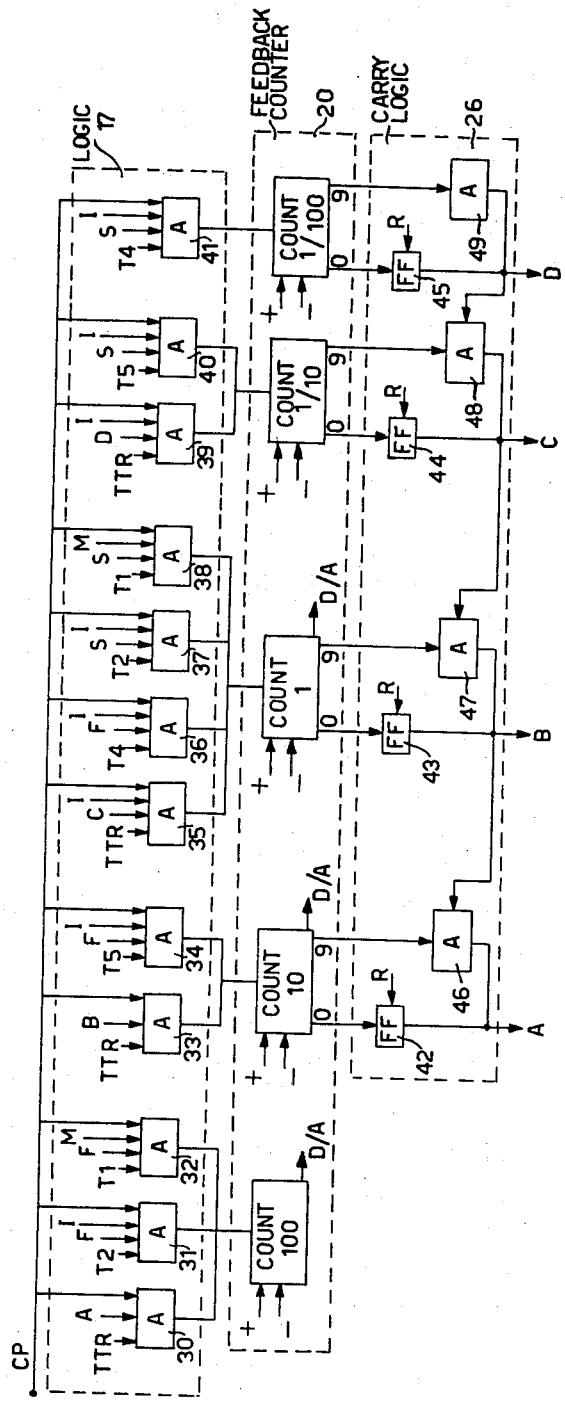
FIG. 2 shows the feedback and display counters together with appropriate logic.
Figure 2:
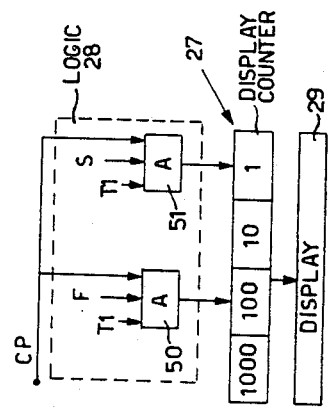
Figure 3:
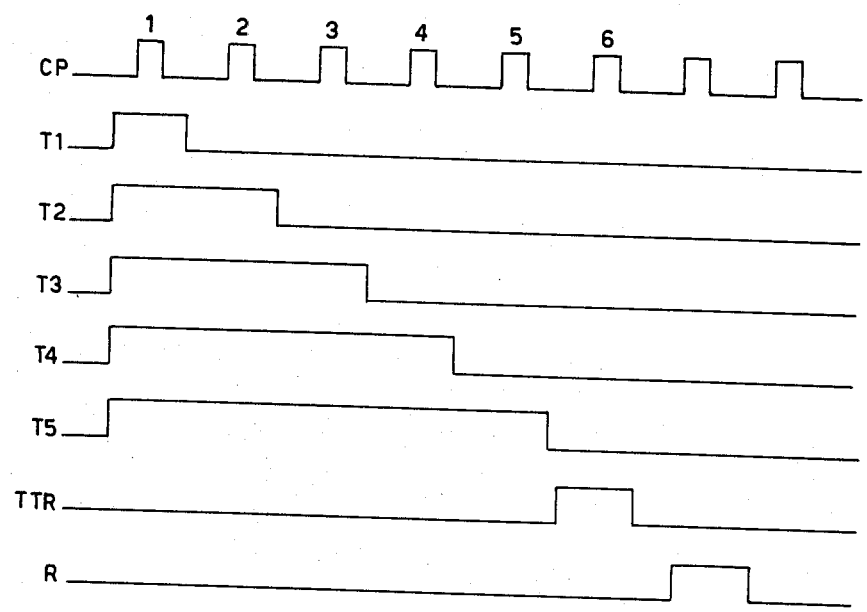
FIG. 3 is a timing diagram.

FIG. 2 shows the internal circuitry of feedback counter 20, logic 17, carry logic 26, logic 28, and display counter 27 while FIG. 3 shows the pulses which are produced by timing unit 21 (FIG. 1), those pulses being CP, T1–T5, and TTR.

Logic 17 comprises AND gates 30–41 which gates are controlled by pulses CP, T1–T5, TTR (from timing unit 21), by pulses A, B, C, D (from carry logic 17), by pulses F, S (from control unit 14), and by pulses I, M (from selector switch 13).

Logic 17 is connected to the five stage feedback counter 20, each stage of which corresponds to a succeeding decimal decade. Feedback counter 20, as aforementioned, always counts in metric units, viz. microns; the decades count 1, count 10, and count 100 correspond to units, tens, and hundreds or microns respectively while decades count 1/10 and count 1/100 correspond to tenths and hundredths of a micron. As will be discussed, count 1/10 and 1/100 are only used when the converter is in the inch mode; when the converter is in the metric mode only the upper three decades are used (i.e. count 1 – count 100). The upper three decades are connected to digital to analog converter 4 (FIG. 1) and the lower four decades are connected to carry logic 26. Connected to each counting decade are the forward-reverse count control signals (+,–) which are produced by control unit 14 (FIG. 1).

Carry logic 26 comprises flip-flops 42–45 and AND gates 46–49. Flip-flops 42–45 are set when counters 10, 1, 1/10, or 1/100 switch from 9 to 0 while AND gates 46–49 are energized by counters 10, 1, 1/10 and 1/100 so long as a "9" is present in the counters. The output pulses A, B, C, D of carry logic 26 are applied to AND gates 30, 33, 35, and 39 of logic 17.

Logic 28 is connected to display counter 27, which counter produces a digital indication of the analog movement. The display counter 27, unlike feedback counter 20, counts in either metric or inch units. That is, if a particular number is contained in display counter 27, that number represents either microns or $10^{-4}$ inches depending on whether selector switch 13 (FIG. 1) is in the metric mode or the inch mode. Logic 28 contains AND gates 50 and 51 which are connected to the 100 and the unit decades respectively of counter 27. AND 50, which is enabled during the fast count mode, is controlled by counting pulses CP, timing pulse T1, and pulse F produced by control unit 14 (FIG. 1). AND 51, which is enabled during the slow count mode, is controlled by pulses CP, T1, and S.

OPERATION OF FIG. 2

In order to more easily understand the structure of FIG. 2, a description of its operation will be given.

The first case to be considered in the operation of the system while in the metric mode. Selector switch 13 (FIG. 1) is switched to lead 11 and lead 24 is energized by signal M, which indicates to logic 17 that the conversion is to be carried out in metric units. AND gates 32 and 38 of logic 17 receive the M signal. As aforementioned, control unit 14 (FIG. 1) determines whether the analog error signal corresponds to greater than 100 microns. Assuming that the error is less than 100 microns, control unit 14 will therefore produce the signal S, indicating that the system is to operate in the slow conversion mode. AND gate 38 will thereby have both the M and S input energized. Also AND 51 of logic 28 will receive the S signal.

Counting pulses CP and timing pulse T1 (FIG. 3), which are produced by control unit 14 (FIG. 1), are applied to both AND 38 of logic 17 and to AND 51 of logic 28. During the time period of T1 it will be seen that only AND gates 38 and 51 have all of their inputs energized; therefore AND 38 passes a pulse to count 1 and AND 51 increases the unit stage of counter 27 by one pulse. Therefore both the feedback counter 20 and the display counter 27 have been incremented by one unit. It will be seen that throughout the remainder of the timing cycle, T2–T5, no other AND gates will have all their inputs energized.

Now the operation of the system in the inch mode will be described. Selector switch 13 (FIG. 1) is positioned on lead 12 of transformer 10 thereby entering the system into the inch mode. The analog error signal is reduced by a factor of 1/2.54 before being fed to control unit 14. Therefore it is necessary for an error of 2.54 microns to exist before the thresholds in control 14 indicate an error. When there is an error of 2.54 microns, the control unit 14 will activate the fast conversion mode; any error less than 254 microns (and greater than 2.54 microns) will cause the control unit 14 to activate the slow conversion mode. Assume that the error signal indicated a displacement of greater than 2.54 microns and less than 254 microns and the system is in the inch mode. The signal I will be produced by selector 13 and applied to AND gates 31, 34, 35, 36, 37, 39, 40 and 41. The slow mode signal S produced by control 14 will be applied to AND gates 37, 38, 40, and 41 in logic 17 and to AND 51 in logic 28. The gates which have both S and I signals are 37, 40, and 41.

AND gate 51 is enabled during timing pulse T1 and CP–1 (FIG. 3) passes into the unit stage of display counter 27 registering a unit of displacement. AND 37 is enabled by T2 thereby allowing two clock pulses CP–1 and CP–2 (FIG. 3) to enter Count 1. AND 40 is enabled by T5 thereby allowing five clock pulses CP–1 through CP–5 to enter Count 1/10 while AND 41, enabled by T4, allows CP–1 through CP–4 to enter Count 1/100. At the end of T–5, feedback counter 20 contains the count 2.54 microns while display counter 27 contains a "1." Since the system is in the inch mode, the operator knows that the "1" corresponds to $1 \times 10^{-4}$ inches (which equals 2.54 microns).

In order to describe the operation of carry logic 26 a specific example will be carried through. Assume that the system is in the inch mode (slow) and that the number in feedback counter 20 is: 197.48.

An error greater than 2.54 microns exists and the feedback counter alters during the conversion timing cycle as follows:

| T1 | 1 9 8.5 9 | Feedback Counter |
|---|---|---|
| T2 | 1 9 9.6 0 | |
| T3 | 1 9 9.7 1 | |
| T4 | 1 9 9.8 2 | |
| T5 | 1 9 9.9 2 | |

That is, Count 1 has received 2 count pulses CP–1 and CP–2, Count 1/10 has received 5 count pulses CP–1 through CP–5 and Count 1/100 received 4 count pulses CP–1 through CP–4. Since Count 1/100 has passed from 9 to 0, thereby setting flip-flop 45, line D of carry logic 26 is energized. Since a 9 is present in Count 1/10, and flip-flop 45 is set, AND 48 is enabled, thereby causing line C to be energized. Similarly, since a 9 is present in Count 1 and AND 48 is energized, AND 47 is also enabled, causing line B to be energized. Again, since there is a 9 in Count 10 and AND 47 is enabled, AND 46 causes line A to be energized. Therefore all four carry logic lines A, B, C and D are energized at the end of time T5. Lines A, B, C and D are connected to AND gates 30, 33, 35 and 39 respectively. Tens transfer line TTR is also connected to these gates and so when TTR pulse appears after T5 (FIG. 3) AND gates 30, 33, 35 and 39 pass clock pulse CP–6 into counting stages Count 100, Count 10, Count 1, and Count 1/10 thereby causing the feedback counter 20 to alter as follows:

| T5 | 1 9 9.9 2 | Feedback Counter |
|---|---|---|
| TTR | 2 0 0.0 2 | |

This ends the conversion cycle and the contents of count 100 – count 1 are read by D-A converter 4 (FIG. 1) and the flip-flops 42–45 receive a reset pulse from oscillator 30 (FIG. 1).

If an error still exists another conversion cycle is carried out:

| | 2 0 0.0 2 | Feedback Counter |
|---|---|---|
| T1 | 2 0 1.1 3 | |
| T2 | 2 0 2.2 4 | |
| T3 | 2 0 2.3 5 | |
| T4 | 2 0 2.4 6 | |
| T5 | 2 0 2.5 6 | |

Since the contents of none of the counters passed from 9 to 0 and since there are no "9's" present at the end of T5, none of the lines A B C or D are energized and, accordingly, tens transfer pulse TTR has no effect of the counter contents.

If the converter is in the metric mode and an error signal corresponding to an error of greater than 100 microns is produced, control unit 14 energizes line F causing the fast conversion phase to be entered. Similarly the fast phase is entered if the system is in inch mode and an error of greater than 254 microns ($100 \times 10^{-4}$ inch) exists. If the system is in the fast phase and in the metric mode, AND gate 32 receives both the M and F signals together with T1 and CP, while AND 50 of logic 28 receives F, T1 and CP. Therefore the 100 decades of both the feedback counter and the display counter receives a single clock pulse CP–1 indicating a displacement of 100 microns.

If the system is in the fast phase and in the inch mode, display counter 27 again receives a single clock pulse CP–1 in the 100 decade indicating a displacement of $100 \times 10^{-4}$ inches (254 microns). Count 100 receives clock pulses CP–1 and CP–2 through AND 31; Count 10 receives CP–1 through CP–5 from AND 34; and, Count 1 receives CP–1 through CP–4 from AND 36. Feedback counter 20 therefore indicates a count of 254 microns at the end of the counting cycle while display counter 27 indicates a count of 100 (which represents $100 \times 10^{-4}$ inches).

The system operates in the negative count mode if the control unit indicates that the error is in the negative direction.

The outputs 18 and 19 of control unit 14 (FIG. 1) determine whether the feedback and display counters are to count in a negative or positive direction. The carry logic flip-flops 42–45 (FIG. 2) are set when the count of any particular decade shifts from 0 to 9. The bidirectional count feature allows the converter to follow the analog movement.

Figure 4:
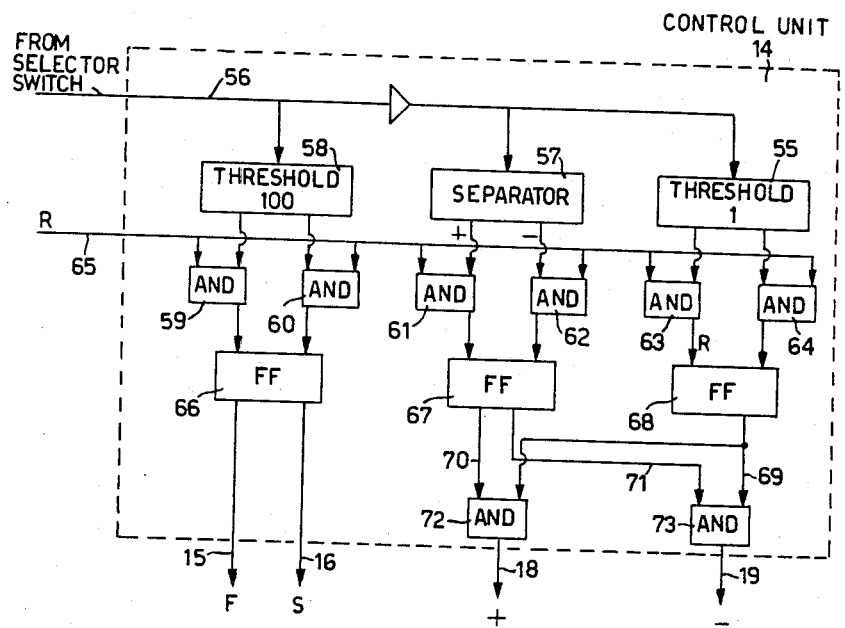
FIG. 4 shows the internal elements of the control unit.

FIG. 4 depicts the control unit 14 of FIG. 1 in detail. The control unit is the same as that disclosed in the cross referenced U.S. patent and for an in depth discussion of this unit this Patent should be consulted.

The control unit 14 of FIG. 4 has threshold circuit 55 which circuit determines whether or not there is an error voltage on line 56 of sufficient magnitude to warrant altering the converter's counters. Threshold 55 is set so as to require an error voltage corresponding to at least one micron of movement when the selector switch is set to metric conversion. Of course if the switch 13 (FIG. 1) is set to the inch mode a movement of 2.54 microns would be necessary to generate an error signal on line 56 of sufficient magnitude to overcome threshold 55.

Separator circuit 56 functions to separate the positive going half waves from the negative going half waves of the error signal on line 56 as is well known in the art. The separator 56 functions to determine whether the error signal is positive or negative. Threshold 58 functions to determine whether the converter should be in the fast or slow count mode. Its threshold is effectively 100 times larger than that of threshold 55. In the metric mode a 100 micron error is necessary to overcome threshold 58 while in the inch mode a 254 error is necessary.

Lead 65 carries pulse R, which is used for timing purposes, to AND gates 59–64. If threshold 55 is overcome AND 64 will be enabled setting flip-flop 68, thereby producing a signal on output 69. If threshold 55 is not overcome, AND 63 will be enabled, thereby resetting flip-flop 68 so that no output appears on output 69. During the period when pulse R is present on line 65, if the error signal on lead 56 is positive, and 61 will be enabled causing a signal to appear on output lead 70 of flip-flop 67. If, on the other hand, the error is negative, AND 62 and flip-flop 67 will cause a signal to appear on output 71 of flip-flop 67. If lead 69 is energized, indicating the presence of an error, and lead 70 is also energized, indicating positive error, AND 72 will be enabled causing a signal to appear on lead 18. If, on the other hand, there is a signal on leads 69 and 71, AND 73 will be enabled causing a signal on lead 19. As aforementioned, in connection with FIGS. 1 and 2, leads 18 and 19 control the direction of converter's counters.

Should the error signal be great enough to overcome threshold 58, AND 56 will be enabled, thereby causing flip-flop 66 to produce signal on line 15. If threshold 58 is not overcome lead 16 will be energized. Leads 15 and 16 determine whether the converter should operate in the fast or slow count phase, as has been discussed.

A converter capable of metric-inch readout has been described. Of course conversion with other units of readout are within the teachings of this invention. By altering the output taps of transformer 10 (FIG. 1) and the timing signal connection in logic 17, any desired set of readout units can be attained. Also more than two choices of readout units can be achieved by directly extending the teachings of the specific embodiment.

The conversion techniques taught by this invention can also be used to measure electrical as well as mechanical analog quantities.

Further, it should be noted that the feedback counter can be made to count in single steps at all times while the display counter can be incremented in a variety of ways by appropriate changes in the logic and timing. For example, the feedback counter could always count in the metric system in steps of one while the display counter could count in steps of 5 so as to have a representation of the true displacement in the scale 5:1.

We claim:

1. A converter for registering an analog quantity in digital form, said quantity being registered in either of at least two different units of measurement, said converter comprising:
   means for selecting either a first or a second unit of measurement;
   first counter means for registering said analog quantity in only said first unit of measurement;
   second counter means for registering said analog quantity in said first unit of measurement when said first unit has been selected by said selecting means and in said second unit when said second unit has been selected by said selecting means;
   digital to analog converter means, connected to said first counter, for converting the contents of said first counter to a first analog signal;
   comparing means, connected to said digital to analog converter, for comparing said first analog signal with said analog quantity, said means for selecting being operatively connected to said comparing means; and,
   means for incrementing said first and said second counters, connected between said counters and said means for selecting, said incrementing means including means for supplying a count to said first counter which differs from the count supplied to said second counter when said second unit of measurement has been selected by said selecting means.

2. A converter according to claim 1 wherein said means for incrementing said counters includes means for incrementing upper or lower decades of said counters depending on the magnitude of the difference between said analog quantity and said first analog signal.

3. A converter according to claim 1 wherein said counters are bidirectional.

4. An analog to digital converter for registering an analog input signal in either of two different units of measurement, said units being related by a conversion factor, said converter, comprising:
   means for comparing said analog input signal with a feedback analog signal to produce an analog error signal;
   unit selection means having a first unit position and a second unit position and including transforming means for altering the magnitude of said error signal by said conversion factor when said unit selection means is in said second unit position;
   a first counter means for registering the magnitude of said analog input signal in said first unit of measurement regardless of the position of said unit selection means;
   a second counter means for registering the magnitude of said analog input signal in said first unit of measurement when said first unit position has been selected and in said second unit of measurement when said second unit position has been selected;
   means for incrementing said counters connected between said unit selection means and said counters; and
   digital to analog converter means, connected between said comparing means and said first counter, for providing said feedback signal in accordance with the count in said first counter.

5. A converter for registering an analog input signal in either of two units of measurement, said units being related by a factor of conversion, said converter comprising:
   means for comparing said analog input signal with a feedback analog signal to produce an error analog signal;
   unit selector means for selecting between said two units of measurement, said selector including means for transforming the magnitude of said error signal in accordance with said factor of conversion, said unit selector connected to an output of said comparing means;
   control means, connected to an output of said unit selector;
   means for generating counting and timing pulses;
   a first counter means, connected to said means for generating, for counting pulses in only one of said two units of measurement;
   a second counter means, connected to said means for generating, for counting pulses in a first one of said two units of measurement when said first unit has been selected by said selector and in a second of said two units when said second units has been selected;
   means connecting said control means to said first and second counter;
   means connecting said unit selector to said first counter; and digital to analog converter means, connected between said first counter and said comparing means, for producing said feedback signal.

6. The converter according to claim 5 wherein said control means includes means for selecting a coarse or fine count mode for said first and second counters depending on the magnitude of said analog error signal.

7. The converter according to claim 5 wherein said counters are bidirectional and said control means includes means for controlling the direction of count.

8. An analog to digital converter having a conversion cycle, said converter comprising:
   means for comparing an input analog signal with a second analog signal to produce an error signal;
   a unit of measurement selection means for selecting between at least a first and a second unit of measurement, said selection means being connected to said comparing means;
   a first counting means for registering in digital form an input analog signal, said first counting means always operating in said first measurement unit choice;
   a second counting means for registering in digital form the input analog signal, said second counting means operating in said first measurement unit choice when said first unit has been selected by said selection means and in said second unit when said second unit has been selected;
   first logic means for passing a number of counting pulses to said first counter during said conversion cycle, said number being dependent upon said measurement unit choice, said selection means being connected to said first logic means;
   second logic means for passing a single pulse to said second counter during said conversion cycle regardless of said measurement unit choice; and
   a digital to analog converter connected between said first counter and said comparing means for producing said second analog signal.

* * * * *